United States Patent
Nobis et al.

(10) Patent No.: US 8,448,342 B2
(45) Date of Patent: May 28, 2013

(54) UNIT OF AT LEAST TWO TARGET ARRANGEMENTS FOR OPTICALLY MEASURING AN AXLE AND DEVICE FOR OPTICALLY MEASURING AN AXLE

(75) Inventors: Guenter Nobis, Nuertingen (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/063,173

(22) PCT Filed: Sep. 11, 2009

(86) PCT No.: PCT/EP2009/061794
§ 371 (c)(1),
(2), (4) Date: May 13, 2011

(87) PCT Pub. No.: WO2010/029146
PCT Pub. Date: Mar. 18, 2010

(65) Prior Publication Data
US 2011/0265337 A1 Nov. 3, 2011

(30) Foreign Application Priority Data

Sep. 12, 2008 (DE) .......................... 10 2008 042 019
Sep. 7, 2009 (DE) .......................... 10 2009 029 241

(51) Int. Cl.
*G01B 11/275* (2006.01)
(52) U.S. Cl.
USPC ........................................ 33/288; 33/203.18
(58) Field of Classification Search
USPC ............................................ 33/288, 203.18
See application file for complete search history.

(56) References Cited

U.S. PATENT DOCUMENTS

| 4,934,063 | A | * | 6/1990 | Speisser | 33/608 |
| 5,535,522 | A | | 7/1996 | Jackson | |
| 5,600,435 | A | * | 2/1997 | Bartko et al. | 33/288 |
| 5,724,128 | A | * | 3/1998 | January | 33/288 |
| 5,724,129 | A | * | 3/1998 | Matteucci | 33/203.18 |
| 5,724,743 | A | * | 3/1998 | Jackson | 33/288 |
| 5,731,870 | A | * | 3/1998 | Bartko et al. | 33/288 |
| 5,760,938 | A | * | 6/1998 | Hodge | 33/288 |
| 6,148,528 | A | * | 11/2000 | Jackson | 33/288 |
| 6,323,776 | B1 | | 11/2001 | Jackson et al. | |
| 6,397,164 | B1 | * | 5/2002 | Nobis et al. | 702/150 |
| 6,404,486 | B1 | * | 6/2002 | Nobis et al. | 356/139.09 |
| 6,424,411 | B1 | * | 7/2002 | Rapidel et al. | 33/288 |
| 6,658,749 | B2 | * | 12/2003 | Jackson et al. | 33/203.12 |
| 6,684,516 | B2 | * | 2/2004 | Voeller et al. | 33/203.18 |
| 6,710,866 | B1 | * | 3/2004 | Adolph | 33/203.18 |
| 6,799,376 | B1 | * | 10/2004 | Hillman et al. | 33/203.18 |
| 7,062,861 | B2 | * | 6/2006 | O'Mahony et al. | 33/288 |
| 7,069,660 | B2 | * | 7/2006 | Robb et al. | 33/203.16 |
| 7,121,011 | B2 | * | 10/2006 | Murray et al. | 33/288 |

(Continued)

*Primary Examiner* — Yaritza Guadalupe-McCall
(74) *Attorney, Agent, or Firm* — Kenyon & Kenyon LLP

(57) ABSTRACT

A set according of target assemblages for optical chassis measurement encompasses at least two target assemblages that are each provided for mounting on a wheel of a motor vehicle, as well as a respective target and a target holder having a target receptacle on which the target is mounted. Each of the target holders is mountable on a wheel of a motor vehicle in such a way that the target is oriented at an angle to the wheel center plane. A significant mark and at least two further undetermined marks are disposed on the target, and the spacing of the significant mark from a reference plane of the respective target assemblage is unknown, but the same in each case for all target assemblages.

9 Claims, 4 Drawing Sheets

U.S. PATENT DOCUMENTS

| | | | | |
|---|---|---|---|---|
| 7,152,333 | B1 * | 12/2006 | Chou | 33/203.18 |
| 7,230,694 | B2 * | 6/2007 | Forster et al. | 356/139.03 |
| 7,424,387 | B1 * | 9/2008 | Gill et al. | 33/288 |
| 7,454,841 | B2 * | 11/2008 | Burns et al. | 33/288 |
| 7,535,558 | B2 * | 5/2009 | Uffenkamp et al. | 356/138 |
| 7,877,883 | B2 * | 2/2011 | Schommer et al. | 33/203 |
| 7,908,751 | B2 * | 3/2011 | Nobis et al. | 33/288 |
| 8,033,028 | B2 * | 10/2011 | Stieff et al. | 33/203.18 |
| 2004/0139620 | A1 | 7/2004 | Stopa | |
| 2005/0096807 | A1 * | 5/2005 | Murray et al. | 701/29 |
| 2008/0186514 | A1 * | 8/2008 | Uffenkamp et al. | 356/623 |
| 2008/0209744 | A1 | 9/2008 | Stieff et al. | |
| 2008/0250842 | A1 * | 10/2008 | Nobis et al. | 73/1.79 |
| 2008/0289202 | A1 * | 11/2008 | Kassouf et al. | 33/288 |
| 2008/0319706 | A1 * | 12/2008 | Uffenkamp et al. | 702/150 |
| 2010/0037473 | A1 * | 2/2010 | Schommer et al. | 33/228 |
| 2011/0185584 | A1 * | 8/2011 | Kassouf et al. | 33/288 |
| 2011/0265337 | A1 * | 11/2011 | Nobis et al. | 33/288 |
| 2011/0302795 | A1 * | 12/2011 | Nobis et al. | 33/288 |

* cited by examiner

UNIT OF AT LEAST TWO TARGET ARRANGEMENTS FOR OPTICALLY MEASURING AN AXLE AND DEVICE FOR OPTICALLY MEASURING AN AXLE

FIELD OF THE INVENTION

The present invention relates to a set of at least two target assemblages for optical axis measurement, and to an apparatus for optical axis measurement of wheels of a motor vehicle.

BACKGROUND INFORMATION

Apparatuses and methods for optical chassis measurement, in which control point fields of targets are imaged using monoscopic image acquisition devices, are known in the existing art. The position of these control points in a local three-dimensional target coordinate system is known to the evaluation unit of the measurement system, and the evaluation unit can determine therefrom the relevant chassis parameters of the motor vehicle.

Such targets, with control point fields disposed on them, are highly complex, make considerable demands in terms of the fabrication of such targets, and accordingly are relatively expensive.

SUMMARY OF THE INVENTION

It is therefore an object of the exemplary embodiments and/or exemplary methods of the present invention to describe a set of target assemblages for optical chassis measurement that requires less complexity and can therefore be manufactured economically, and that is equally suitable for chassis measurement. A further intention is to describe an economical apparatus for optical axis measurement of wheels of a motor vehicle, which apparatus is easy to operate and furnishes very accurate measured values.

This object is achieved by the subject matter described herein. Advantageous refinements are evident from the further descriptions herein.

A set according to the exemplary embodiments and/or exemplary methods of the present invention of target assemblages for optical chassis measurement encompasses at least two target assemblages that are provided for mounting on a wheel of a motor vehicle.

In the simplest embodiment of the invention, the set of target assemblages can each encompass two target assemblages that are mounted on the wheels of one axle of a motor vehicle. The target assemblages on the other axle or axles of the motor vehicle can then differ from the target assemblage set according to the present invention.

The target assemblage set according to the present invention can also encompass four respective target assemblages that are mounted on the wheels of a motor vehicle. For three-axle or multi-axle vehicles, in particular trucks, a target assemblage set according to the present invention can encompass six or more target assemblages.

In the case of the target assemblage set in accordance with the description herein, it is sufficient if there exists, on the target of each target assemblage of the target assemblage set, one significant mark whose spacing from a reference plane of the respective target assemblage is unknown, but is the same or constant in each case for all target assemblages of the target assemblage set. The other at least two further marks can be undetermined.

In the case of the target assemblage set in accordance with the description herein, it is sufficient if a first significant mark whose spacing from a reference plane of the respective target assemblage is unknown, but is the same in each case for all target assemblages, a second significant mark, and at least one further undetermined mark are disposed on each target of the target assemblages of the target assemblage set according to the present invention.

The optical features on the target do not constitute a control point system, i.e. their position in a local coordinate system is not known.

To allow an axis measurement to be carried out according to the present invention, it is sufficient if three marks are present on each target of the target assemblages. The significant mark in accordance with the description herein, or the two significant marks in accordance with the description herein, can be employed in this context for the calibration operation.

In the calibration operation, an image sequence is acquired of the significant mark and of the at least two undetermined marks of the target assemblages of the target assemblage set in accordance with the description herein, or of the significant marks and of the at least one further undetermined mark of the target assemblage of the target assemblage set in accordance with the description herein.

As the wheels roll, these marks each map out a circular path. A local three-dimensional coordinate system; the spatial position of the wheel rotation axis in the local three-dimensional coordinate system, in order to compensate for the wheel rim runout; and the location of the wheel center plane in the local three-dimensional coordinate system, are determined by an evaluation unit. The longitudinal center plane of the vehicle can be determined therefrom. The data are stored in the evaluation unit for the subsequent measurement operation.

The position of the image acquisition device or devices in a common measurement station system is known to the evaluation unit, optionally by the use of cross-reference cameras.

After the calibration operation and before the actual measurement operation, the contact plates are unlocked, thus releasing tension on the contact surface of the wheels.

In the context of the actual measurement operation subsequent to the calibration operation, a single image acquisition of at least three marks of the respective target is actuated by the respective image acquisition device, which can be embodied as a stereo camera assemblage but also as a monoscopic camera assemblage, in order to determine toe-in and camber. Because the local three-dimensional coordinate system of the marks of the targets has been determined by the calibration operation, the location of the at least three imaged marks indicates the spatial position of the respective wheel axle in the known three-dimensional coordinate system, and the toe-in and camber angles of the respective wheels can be identified therefrom.

According to an embodiment of the invention, the significant mark or marks require no further consideration after the calibration operation; it is entirely sufficient if three undetermined marks, which were determined in the local three-dimensional coordinate system together with the significant mark, are imaged by the measurement heads in the context of the actual measurement.

In a first embodiment of the target assemblage set according to the present invention, in which two significant marks are disposed on each of the targets, the spacing of the second significant mark from the first significant mark is known for all target assemblages. The advantage resulting from this is that temperature influences on the measurement cameras, which can change the spacing of the base (often fabricated from aluminum) between the two cameras embodied as stereoscopic cameras, can be compensated for High accuracy in the resulting measured values can thereby be guaranteed. The scale problem that occurs because of temperature influences acting on the measurement units, for example sunlight striking the measurement unit, is accordingly solved.

According to an embodiment, alternative to this, of the target assemblage set according to the present invention in accordance with the description herein, the spacing of the second significant mark from the first significant mark is unknown, but is the same or constant in each case for all target assemblages.

Both embodiments of the target assemblage set according to the present invention, with a known spacing between the two significant marks or with an unknown but respectively consistent spacing of the significant marks from one another, yield the advantage that scale errors of the measurement system are avoided, and the longitudinal center plane of the motor vehicle can be precisely determined as a reference for the individual toe-in of the rear wheels. A measurement of scale information before each chassis measurement can be omitted, and what results is continuous scale monitoring and scale correction, since the targets are always visible during chassis measurement.

According to a further embodiment of the target assemblage set according to the present invention in accordance with the description herein, the spacing of the second significant mark from a reference plane of the target is unknown, but is the same or constant in each case for all target assemblages. Even higher accuracy can be achieved thereby.

The apparatus according to the present invention in accordance with Claim 8 is easy to operate and furnishes very accurate measured values. In accordance with an advantage of the apparatus for optical axis measurement of wheels of a motor vehicle in accordance with the description herein, the spacing of the significant mark or the first significant mark from the reference plane does not need to be known, provided only that it is consistent in each case for all the targets used.

If a target assemblage set as recited in Claim 4 is used in this context, the spacings of the significant marks from one another need not be known to the evaluation unit, as long as they are each consistent for all four targets that are used. Further simplification is thereby achieved.

The present invention is explained below in further detail on the basis of exemplifying embodiments, with reference to the attached Figures.

DETAILED DESCRIPTION

Figure 1:
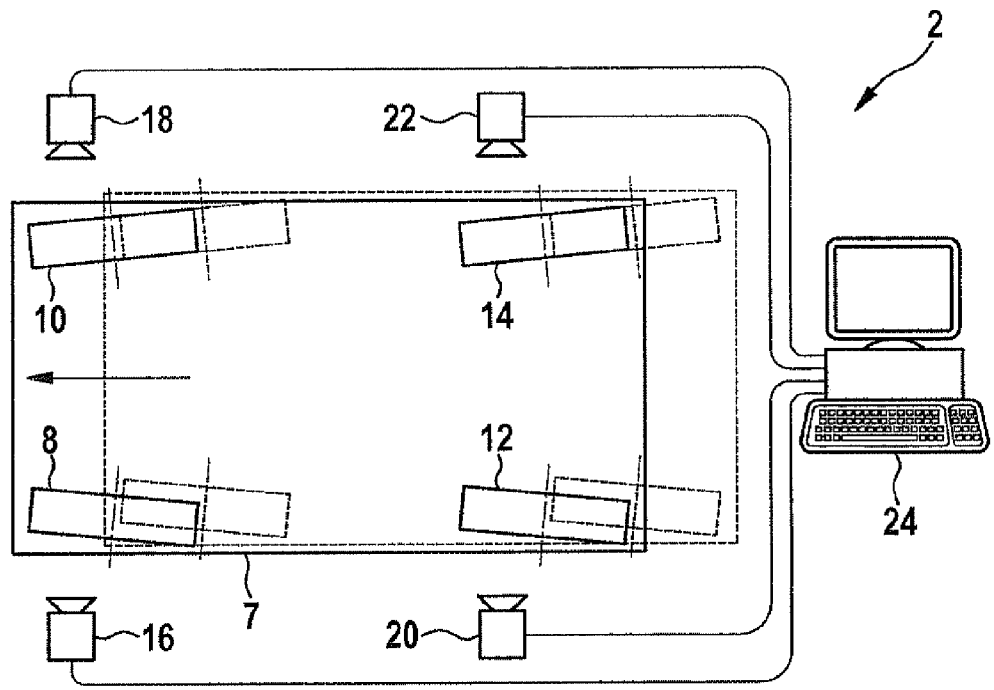
FIG. 1 shows a schematic sketch of a plan view of a measurement station with a motor vehicle standing thereon.

FIG. 1 is a schematic sketch of a plan view of a measurement station 2 with a motor vehicle 7 standing thereon.

Front wheels 8 and 10 and rear wheels 12 and 14 are depicted as having a toe-in angle with respect to the longitudinal vehicle center axis, and for better presentation the bodywork of motor vehicle 7 is depicted only as a schematic outline.

The wheel rotation axes of wheels 8 to 14 are each indicated by dot-dash lines. Next to wheels 8 to 14 are located respective measurement heads 16, 18, 20, and 22 that each possess a stereoscopic measurement camera assemblage (not depicted in FIG. 1) that is capable of imaging motor vehicle wheel 8 to 14 or a portion thereof, or targets mounted on wheels 8 to 14 or portions thereof. Also provided is a data processing unit 24 that is connected to measurement heads 16 to 22 and obtains measurement data from them for evaluation.

Motor vehicle 7 with its wheels 8 to 14 is depicted in a previous vehicle position, with a slight offset to the right, using dashed lines.

Figure 2:
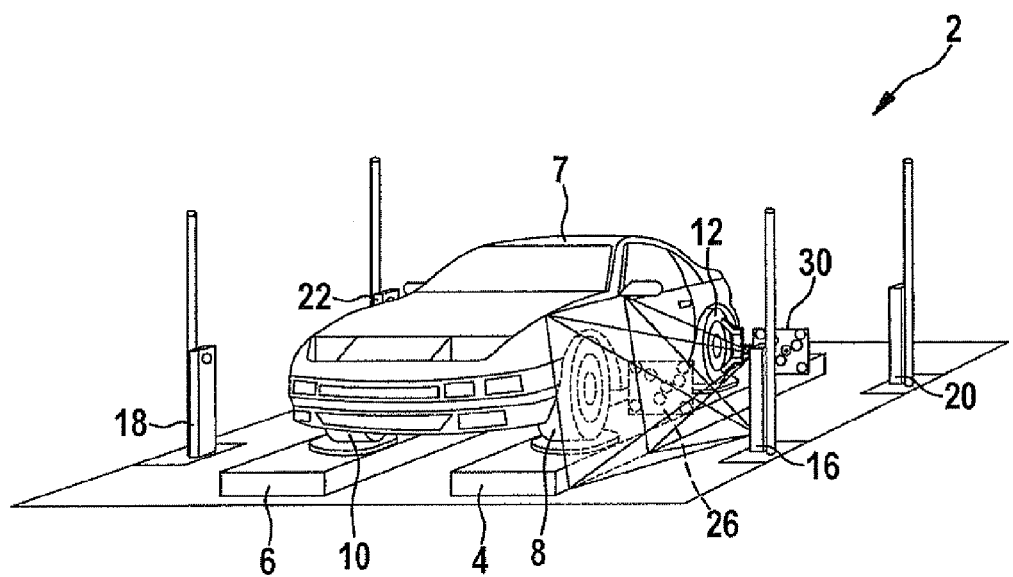
FIG. 2 shows a schematic perspective view of a measurement station with a motor vehicle standing on displacement rails.

FIG. 2 is a schematic perspective view of a measurement station 2 with a motor vehicle 7 standing on displacement rails.

It is evident here that front wheels 8 and 10, as well as left rear wheel 12, of motor vehicle 7 stand respectively on turntables of displacement rails 4 and 6, and that target assemblages 26 and 30, whose targets face substantially outward and are equipped with marks, are mounted on the left wheels 8 and 12 of motor vehicle 7.

Measurement heads 16 to 22 are of columnar configuration and encompass, by way of example, a stereo camera assemblage, i.e. an upper and a lower measurement camera in each case, which are directed toward the respective oppositely located wheel 8 to 14 and can optically sense that wheel or a target mounted thereon.

The two measurement cameras of a measurement head 16 to 22 respectively constitute a stereo system or a stereoscopic image acquisition device. The fields of view of the measurement cameras of left front measurement head 16 are visualized in FIG. 2.

In the calibration operation for measurement station 2, the measurement cameras of measurement heads 16 to 22 furnish an image sequence of at least three images that are acquired as vehicle 7 moves on displacement rails 4 and 6. Evaluation unit 24 calculates from the image data, for each wheel 8 to 14, a local three-dimensional coordinate system, the rotation axis, and the rotation center of wheel 8 to 14. The two-dimensional image coordinates of the marks on targets 26 to 32 are measured in the individual images of the image sequence. An allocation of the corresponding marks over the image sequence is accomplished, i.e. tracking of the marks is carried out. For this purpose, codes can be mounted on the marks on the targets, or standard methods of image processing can be used.

Measurement data evaluation is based on the following mathematical model:

Marks M1 to Mn (i=1 to n) of the respective target are imaged, as they move past, by the respective camera in an image sequence (image number j=1 to m). The positions of the marks in the camera image at time j of the image sequence is x'ij.

Standard image processing methods can be used to determine, from the coordinates x'ij of a stereoscopic image pair, the three-dimensional coordinates Xi (i=1 to n) of the marks in a local wheel coordinate system. From the evaluation of the entire image sequence, the motion parameters (rotation Rj, translation tj) of wheel 8 to 14 at image acquisition time t can be determined, and in addition the accuracy of the three-dimensional coordinates of the marks can be improved.

With monoscopic image acquisition systems, instead of stereoscopic determination of the three-dimensional coordinates from individual image pairs, the three-dimensional coordinates of the marks can be concurrently determined directly in the context of evaluation of the image sequence to determine the motion parameters, using the "structure from motion" principle that is known to one skilled in the art.

From the three-dimensional coordinates of the marks on the target, and from the motion parameters, geometric calculations can be used to determine the rotation axis and rotation center of the wheel in the local wheel coordinate system.

The necessary parameters, for example toe-in and camber values, are determined during the subsequent actual chassis measurement.

Measurement data evaluation can be accomplished separately for all four individual wheels 8 to 14, i.e. for each wheel, together for the oppositely located wheels 8 and 10, and 12 and 14, i.e. for each axle, or together for all wheels 8 to 14, i.e. in an complete-vehicle evaluation. For axle-based and complete-vehicle evaluations, time synchronicity of the acquired images must be created in each case.

Figure 3:
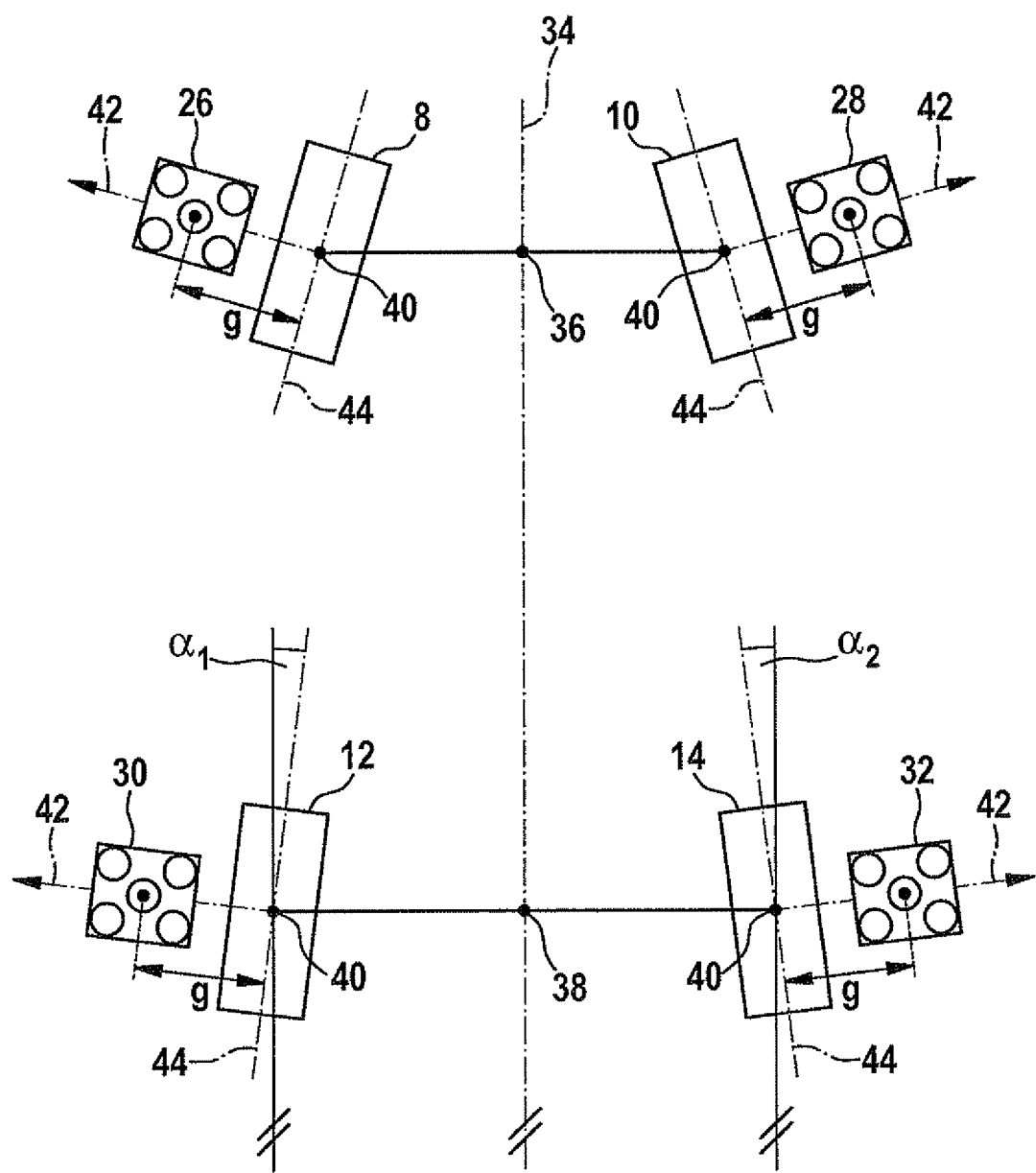
FIG. 3 shows a schematic sketch of a motor vehicle chassis with targets mounted on its wheels.

FIG. 3 is a schematic sketch of a motor vehicle chassis having targets 26 to 32 mounted on wheels 8 to 14.

To simplify the depiction, the target holders with which targets 26 to 32 are mounted on wheels 8 to 14 are not shown. The respective wheel rotation axis 42 and wheel center plane 44, which is defined as the center plane of the wheel rim perpendicular to the wheel rotation axis, are depicted for each wheel 8 to 14. Also depicted are the rotation centers 40 of wheels 8 to 14, which are respectively defined as the intersection point of wheel rotation axis 42 with wheel center plane 44. The track width of the front axle is determined by connecting the two rotation centers 40 of front wheels 8 and 10, and the track width of the rear axle is determined by connecting the two rotation centers 40 of rear wheels 12 and 14. The center of the track width of the front axle is labeled with reference character 36, and the center of the track width of the rear axle with reference character 38. Also evident in FIG. 3 is longitudinal center plane 34, which is determined by connecting the center of the track width of front axis 36 and the center of the track width of rear axle 38. Lines parallel to the longitudinal center plane are drawn through wheel rotation centers 40 of rear wheels 12 to 14. The angle between these parallels and wheel center plane 44 of rear wheels 12 and 14 respectively constitutes toe-in angle α1 of left rear wheel 12 and toe-in angle α2 of right rear wheel 14. The depiction of longitudinal center plane 34 in FIG. 3 corresponds to the definition according to DIN 70 000.

Targets 26 to 32 are each equipped with a significant mark, depicted in centered fashion in FIG. 3 by way of example, which is at a spacing g from wheel center plane 44 that is not known but is constant for all targets 26 to 32. The significant marks with the constant spacing g from wheel center plane 44, and the ascertained rotation axis 42, allow a determination of the coordinates of rotation center 40 for each wheel 8 to 14.

Figure 4:
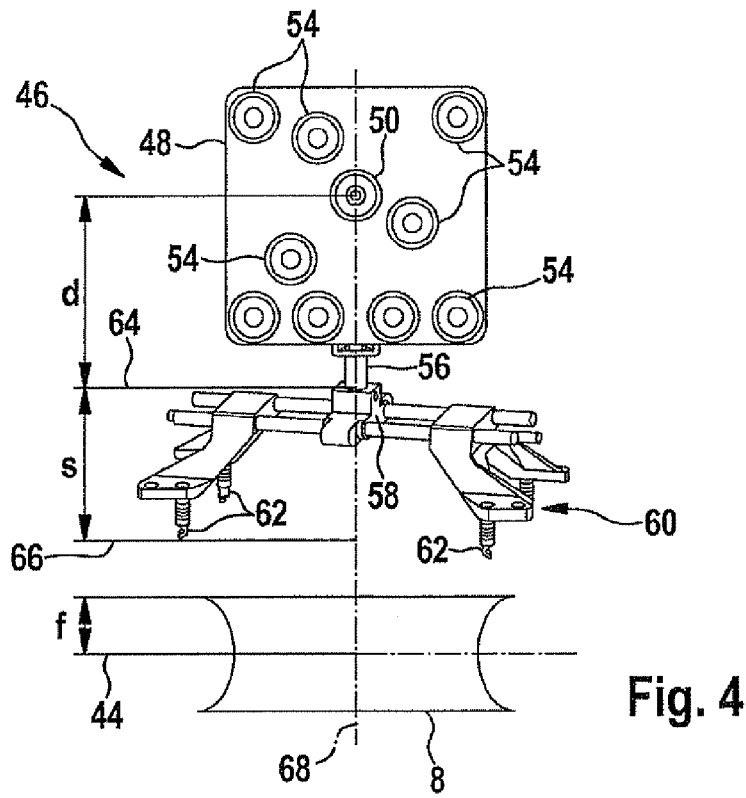
FIG. 4 shows a schematic perspective view of a first target assemblage for mounting on a wheel rim shown schematically therebelow, in accordance with an exemplifying embodiment of the invention.

FIG. 4 is a schematic perspective view of a first target assemblage 46 for mounting on a rim, shown schematically therebelow, of a wheel 8.

Target assemblage 46 encompasses a target 48, embodied in square fashion by way of example in FIG. 4, that is mounted with a bolt 56 in a receptacle 58 of a target holder 60. Target holder 60 encompasses three rails or bars on which are displaceably disposed two clamping elements on which are attached downward-pointing receiving bolts 62 with which target holder 60 can be mounted on wheel rim 8 indicated therebelow and, in particular, can be clamped in place on its rim flange. Target holder 60 further has on receptacle 58 a stop for bolt 56 of target 48 which forms reference plane 64.

For all the target holders 60, the stop for reference plane 64 has the same spacing s as measured to an abutment plane 66 against receiving bolts 62 with which target holders 60 abut against the rim flange of wheel rim 8.

A distance f between abutment surface 66 for receiving bolts 62 on the rim flange, and a wheel center plane 44, is also known. Distance f is vehicle-specific.

A first significant mark 50 is disposed, approximately centeredly, on the front side of target 48. First significant mark 50 has a calibrated spacing d, measured along insertion axis 68, from reference plane 64, which is measured in particular between the feature center of the first significant mark and reference plane 64. This spacing d is not known to the evaluation unit, but is consistent for all target assemblages 46 of a target assemblage set. The total spacing g of significant mark 50 from wheel center plane 44 is thus g d+s+f. Longitudinal vehicle center plane 34 can thereby be ascertained for the vehicle to be measured, in a measurement operation described later, in the measurement station reference system.

The other marks 54 distributed by way of example in FIG. 4 on the front side of target 48 are undetermined, i.e. neither their position nor their mutual spacing are known to evaluation unit 24.

Marks 50 and 54 each contain a circular centered feature that may be executed in a dark color, for example black; a circular ring, surrounding the centered feature, that is executed in particular in a bright, e.g. reflective, color; and a narrower outer circular ring, surrounding said circular ring, that is executed in particular in a dark color, for example the same color as the centered feature. Such marks, in particular their circular centered feature against the bright background of the circular ring surrounding it, are particularly easy to sense optically.

Figure 5:
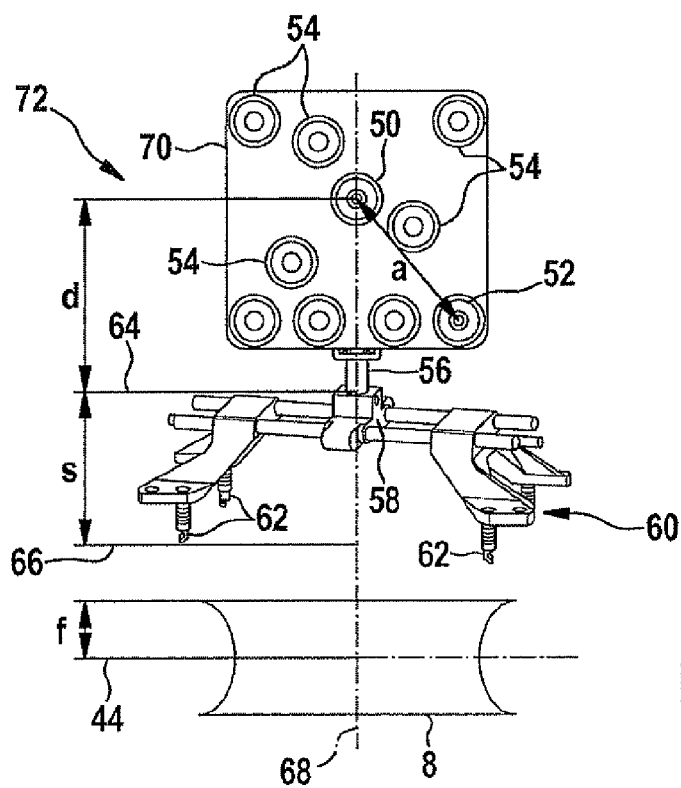
FIG. 5 shows a schematic perspective view of a second target assemblage for mounting on a wheel rim shown schematically therebelow, in accordance with a further exemplifying embodiment of the invention.

FIG. 5 is a schematic perspective view of a second target assemblage 72 for mounting on a wheel rim 8 shown schematically therebelow.

Unlike the case with target 48 of first target assemblage 46, the mark in the lower right corner of target 70 is embodied as second significant mark 52.

In the case of second target assemblage 72 as well, spacing d of first significant mark 50 from reference plane 64 is unknown to the evaluation unit, but is constant for all target assemblages 72 of a target assemblage set.

In a first exemplifying embodiment, spacing a (indicated in FIG. 5 with an arrow) between the two significant marks 50 and 52 is known to evaluation unit 24.

In an exemplifying embodiment alternative thereto, spacing a between the two significant marks 50 and 52 is not known to evaluation unit 24, but this spacing a is consistent for all target assemblages 72 of a target assemblage set.

In both embodiments, the spacing of second significant mark 52 from reference plane 64 is not known to the evaluation unit.

Figure 6:
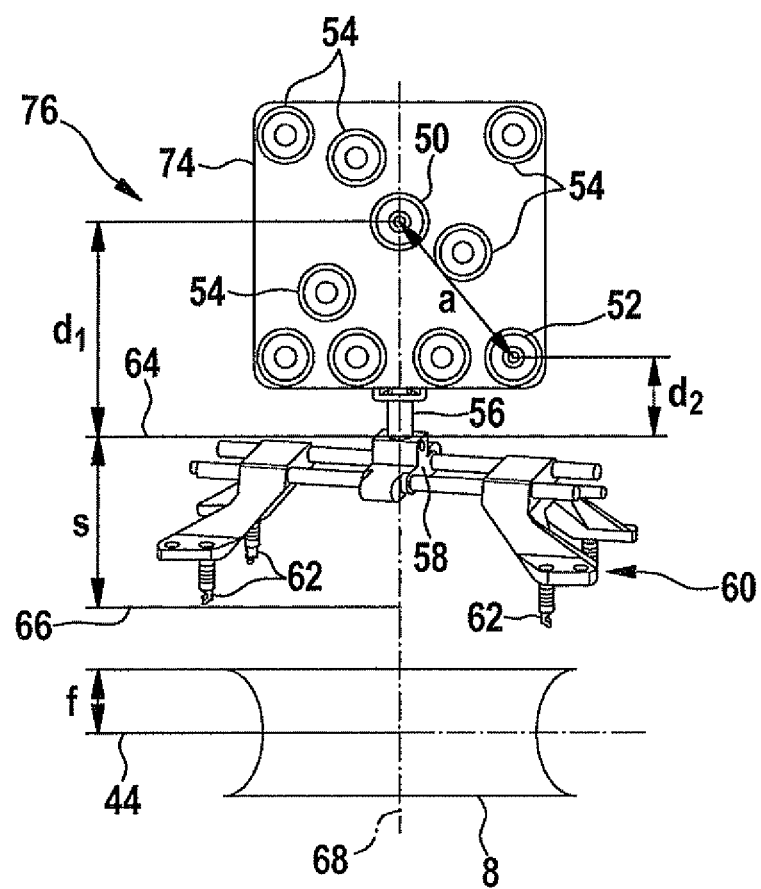
FIG. 6 shows a schematic perspective view of a third target assemblage for mounting on a wheel rim shown schematically therebelow, in accordance with a further exemplifying embodiment of the invention.

FIG. 6 is a schematic perspective view of a third target assemblage 76 for mounting on a wheel rim 8 shown schematically therebelow.

Third target assemblage 76 corresponds largely to second target assemblage 72 in accordance with FIG. 5, spacing d2 of second significant mark 52 from reference plane 64 being additionally indicated here. This spacing d2 is constant for all target assemblages 76 of a target assemblage set, but is not known to the evaluation unit.

For all target assemblages 46, 72, and 76 it is necessary for at least two target assemblages of the same kind to be mounted on a particular axle of motor vehicle 7 that is to be measured. It may be preferred if all the wheels of motor vehicle 7 that is to be measured are equipped with respectively identical target assemblages.

Because all that is required for the individual embodiments is that spacings d, d1, d2, and a of the significant mark(s) be constant, and a known spacing a of the significant marks from one another is required in only one embodiment, target assemblages 46, 72, and 76 are robust and outstandingly suitable for demanding everyday shop use.

All the target assemblages 46, 72, and 76 are of simple construction and allow the rotation axis and rotation center of the wheel to be reliably calculated in the local wheel coordinate system from the three-dimensional coordinates of the marks being viewed on the target and from the motion parameters, and allow determination of the necessary parameters, for example toe-in and camber values, when the chassis is later actually measured.

What is claimed is:

1. A set of at least two target assemblages for optical chassis measurement, comprising:
   at least two target assemblages being for mounting on a wheel of a motor vehicle, each including:
   a target; and
   a target holder having a target receptacle on which the target is mounted, each of the target holders being mountable on a wheel of the motor vehicle so that the target is oriented at an angle to the wheel center plane;
   wherein a significant mark and at least two further undetermined marks is disposed on the target, and wherein a spacing of the significant mark from a reference plane of the respective target assemblage is unknown, but is the same in each case for all of the target assemblages.

2. A set of at least two target assemblages for optical chassis measurement, comprising:
   at least two target assemblages being for mounting on a wheel of a motor vehicle, each including:
   a target; and
   a target holder having a target receptacle on which the target is mounted, each of the target holders being mountable on a wheel of the motor vehicle so that the target is oriented at an angle to the wheel center plane;
   wherein a first significant mark, a second significant mark, and at least one further undetermined mark is disposed on the target, and wherein the spacing of the first significant mark from a reference plane of the respective target assemblage is unknown, but is the same in each case for all of the target assemblages.

3. The target assemblage set of claim 2, wherein the spacing of the second significant mark from the first significant mark is known for all of the target assemblages.

4. The target assemblage set of claim 2, wherein the marks are embodied as dark circular surfaces that are surrounded by a bright background.

5. The target assemblage set of claim 4, wherein the bright background of the marks are embodied in at least one of an annular and a reflective manner.

6. A set of at least two target assemblages for optical chassis measurement, comprising:
   at least two target assemblages being for mounting on a wheel of a motor vehicle, each including:
   a target; and
   a target holder having a target receptacle on which the target is mounted, each of the target holders being mountable on a wheel of the motor vehicle so that the target is oriented at an angle to the wheel center plane;
   wherein a first significant mark, a second significant mark, and at least one further undetermined mark is disposed on the target, and wherein the spacing of the first significant mark from a reference plane of the respective target assemblage is unknown, but is the same in each case for all of the target assemblages;
   wherein the spacing of the second significant mark from the first significant mark is unknown, but is the same in each case for all of the target assemblages.

7. The target assemblage set of claim 6, wherein the spacing of the second significant mark from a reference plane of the target is unknown, but is the same in each case for all of the target assemblages.

8. An apparatus for providing optical axis measurement of wheels of a motor vehicle, comprising:
   a set of at least two target assemblages, which are mounted, at an angle to the wheel center plane, on the wheels of the motor vehicle that are to be measured;
   at least one measuring head having an image acquisition device for imaging the target; and
   an evaluation unit to ascertain by way of image processing, from at least one acquired image of at least three marks of the respective target, the wheel rotation axis and the rotation center of the wheel in a local three-dimensional coordinate system, the local three-dimensional coordinate system being previously determinable in a calibration operation, and to ascertain therefrom the longitudinal center plane of the motor vehicle;
   wherein each of the target assemblages include:
   a target; and
   a target holder having a target receptacle on which the target is mounted, each of the target holders being mountable on a wheel of the motor vehicle so that the target is oriented at an angle to the wheel center plane,
   wherein a significant mark and at least two further undetermined marks is disposed on the target, and wherein a spacing of the significant mark from a reference plane of the respective target assemblage is unknown, but is the same in each case for all of the target assemblages.

9. The apparatus of claim 8, wherein the spacing of a significant mark from the respective wheel center plane being made up of the spacing of the significant mark from a reference plane of the target assemblage, a known spacing of the reference plane of the target assemblage from a clamping plane on the target holder, and the known spacing of the clamping plane from the wheel center plane through a rim flange.

* * * * *